(12) United States Patent
MacWilliams et al.

(10) Patent No.: US 6,247,136 B1
(45) Date of Patent: Jun. 12, 2001

(54) METHOD AND APPARATUS FOR CAPTURING DATA FROM A NON-SOURCE SYNCHRONOUS COMPONENT IN A SOURCE SYNCHRONOUS ENVIRONMENT

(75) Inventors: Peter D. MacWilliams, Aloha, OR (US); Harry Muljono, Union City, CA (US); Thomas J. Mozdzen, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/038,682

(22) Filed: Mar. 9, 1998

Related U.S. Application Data

(63) Continuation-in-part of application No. 08/852,438, filed on May 6, 1997.

(51) Int. Cl.[7] .................................................. G06F 13/00
(52) U.S. Cl. ............................................. 713/401; 710/58
(58) Field of Search .................................. 713/400, 401, 713/503; 711/167; 710/58, 60, 61

(56) References Cited

U.S. PATENT DOCUMENTS

| | | |
|---|---|---|
| 4,141,067 | 2/1979 | McLagan . |
| 4,342,069 | 7/1982 | Link . |
| 4,969,122 | 11/1990 | Jensen . |
| 5,058,006 | 10/1991 | Durdan et al. . |
| 5,155,067 | 10/1992 | Wood et al. . |
| 5,193,163 | 3/1993 | Sanders et al. . |
| 5,249,282 | 9/1993 | Segers . |
| 5,287,484 | 2/1994 | Nishii et al. . |
| 5,319,766 | 6/1994 | Thaller et al. . |
| 5,325,504 | 6/1994 | Tipley et al. . |
| 5,345,576 | 9/1994 | Lee et al. . |
| 5,361,267 | 11/1994 | Godiwala et al. . |
| 5,369,753 | 11/1994 | Tipley . |
| 5,388,224 | 2/1995 | Maskas . |
| 5,434,993 | 7/1995 | Liencres et al. . |
| 5,446,863 | 8/1995 | Stevens et al. . |
| 5,454,093 | 9/1995 | Abdulhafiz et al. . |
| 5,706,484 | 1/1998 | Mozdzen et al. . |
| 5,723,995 | 3/1998 | Mozdzen et al. . |
| 5,774,001 | 6/1998 | Mozdzen et al. . |
| 5,905,391 | * 5/1999 | Mooney . |
| 6,085,345 | * 7/2000 | Taylor . |

OTHER PUBLICATIONS

"IEEE Standard for Low–Voltage Differential Signals (LVDS) for Scalable Coherent Interface (SCI)" Published by the Institute of Electrical and Electronics Engineers, Inc., Jul. 31, 1996, pp. 1–30.

* cited by examiner

*Primary Examiner*—Thomas M. Heckler
(74) *Attorney, Agent, or Firm*—Blakely, Sokoloff, Taylor & Zafman LLP

(57) ABSTRACT

A method and apparatus for communicating signals between a source synchronous component and a non-source synchronous component of a system is described. The present invention provides a strobe signal from the source synchronous component that is delayed and used to latch data received from a non-source synchronous component. The amount of delay provided is determined based on the timing of data request cycles to the non-source synchronous component. Thus, the present invention allows data to be received by a source synchronous component from a component that does not generate a strobe signal used for latching received data that would be generated by a source synchronous component.

26 Claims, 3 Drawing Sheets

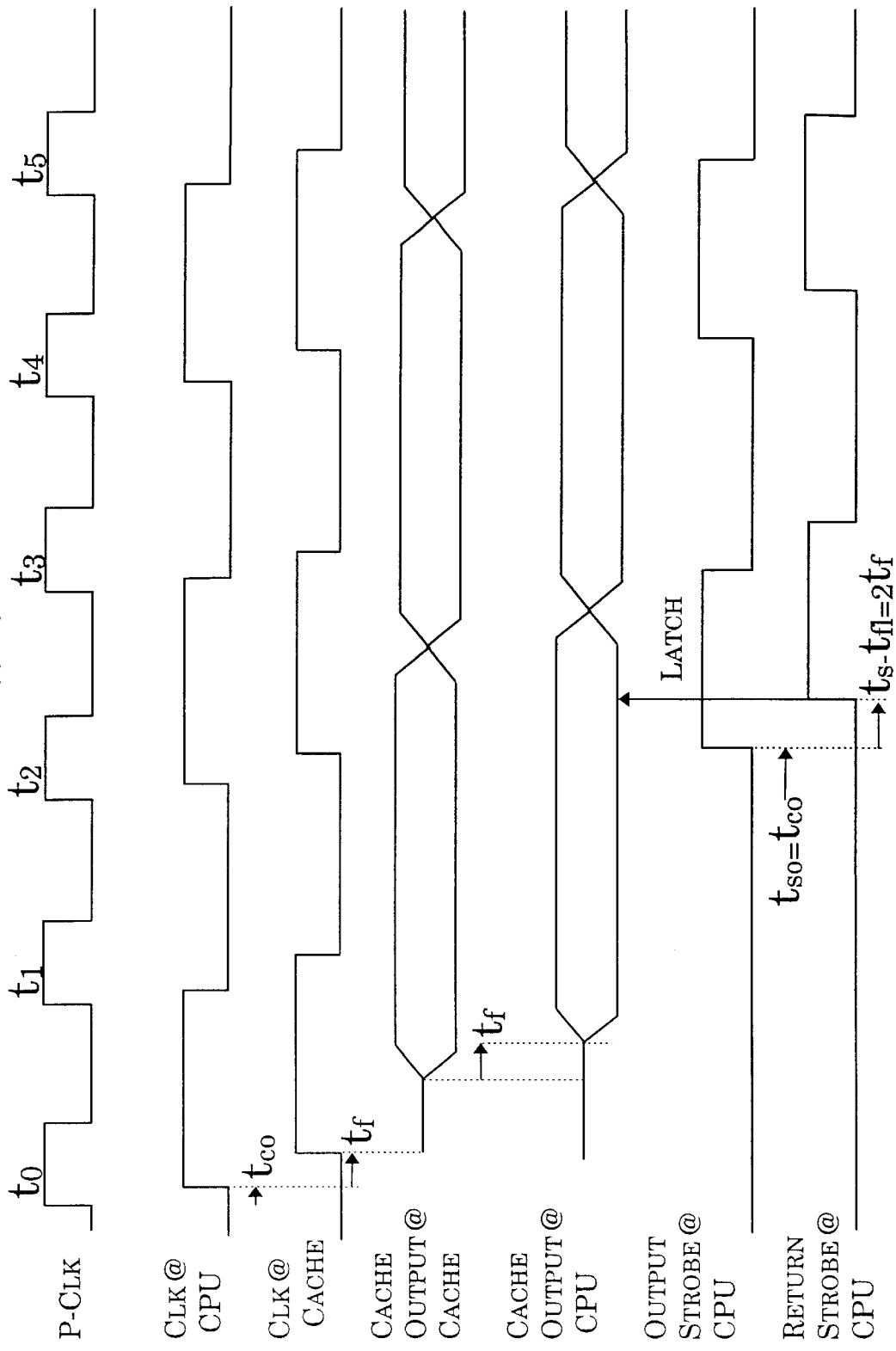

METHOD AND APPARATUS FOR CAPTURING DATA FROM A NON-SOURCE SYNCHRONOUS COMPONENT IN A SOURCE SYNCHRONOUS ENVIRONMENT

This is a continuation-in-part application of application Ser. No. 08/852,438, filed May 6, 1997.

FIELD OF THE INVENTION

The present invention relates to computer systems, and more specifically, to providing an interface between a source synchronous component and a non-source synchronous component in a computer system to capture the data from the non-source synchronous component in the source synchronous component.

BACKGROUND OF THE INVENTION

Many prior art computer systems are common clocked systems where multiple components within the system are driven by a common clock signal. In such systems components such as processors and cache memories are driven by a common clock signal, which is used to synchronize communication between components. However, as operating frequencies have increased, clock skew caused by distribution of the clock signal within the system has become a limiting factor.

In order to overcome the limitations caused by clock skew in common clocked systems, processors have been designed with source synchronous interfaces that send and receive timing information in the form of strobe signals along with data. These strobe signals are used to drive the components receiving the data. However, in order to provide a functional computer system, other components, such as cache memories must be redesigned to communicate in a source synchronous manner, which increases development time and costs associated with the computer system.

Therefore, what is needed is the ability to allow a source synchronous component to capture data received from a non-source synchronous component and thereby communicate with the non-source synchronous component. The present invention provides such a capability.

SUMMARY OF THE INVENTION

An interface between a source synchronous component and a non-source synchronous component that provides a source synchronous signaling scheme is described. A timing generation circuit in the source synchronous component provides timing information to the non-source synchronous component. A delay element delays a strobe signal from the timing generation circuit such that the strobe signal is received at the interface when data requested from the non-source synchronous component is valid at the interface.

DESCRIPTION OF THE DRAWINGS

The present invention is illustrated by way of example, and not by way of limitation, in the figures of the accompanying drawings in which like reference numerals refer to similar elements and in which:

FIG. 3 is one embodiment of a timing diagram of clock and strobe signals according to the present invention.

DETAILED DESCRIPTION

A method and apparatus for communicating signals between a source synchronous component and a non-source synchronous component in a system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention allows common clocked components to be used with source synchronous components. For example, a processor in a computer system my be designed to operate in a source synchronous manner in order to improve performance. The present invention allows the processor to be used with cache memory or other components that do not operate in a source synchronous manner. Thus, cache memory does not have to be designed, or redesigned, to be used with the source synchronous processor, which results in a more flexible and less expensive computer systems.

Briefly, the present invention provides a strobe signal from the source synchronous component that is delayed by a delay element. The delayed strobe signal is fed back to the source synchronous component and is used to latch data received from a non-source synchronous component. The amount of delay provided is determined based on the timing of data request cycles to the non-source synchronous component. Thus, the present invention allows data to be received by a source synchronous component from a component that does not generate a strobe signal for latching data that would be generated by a source synchronous component.

Figure 1:
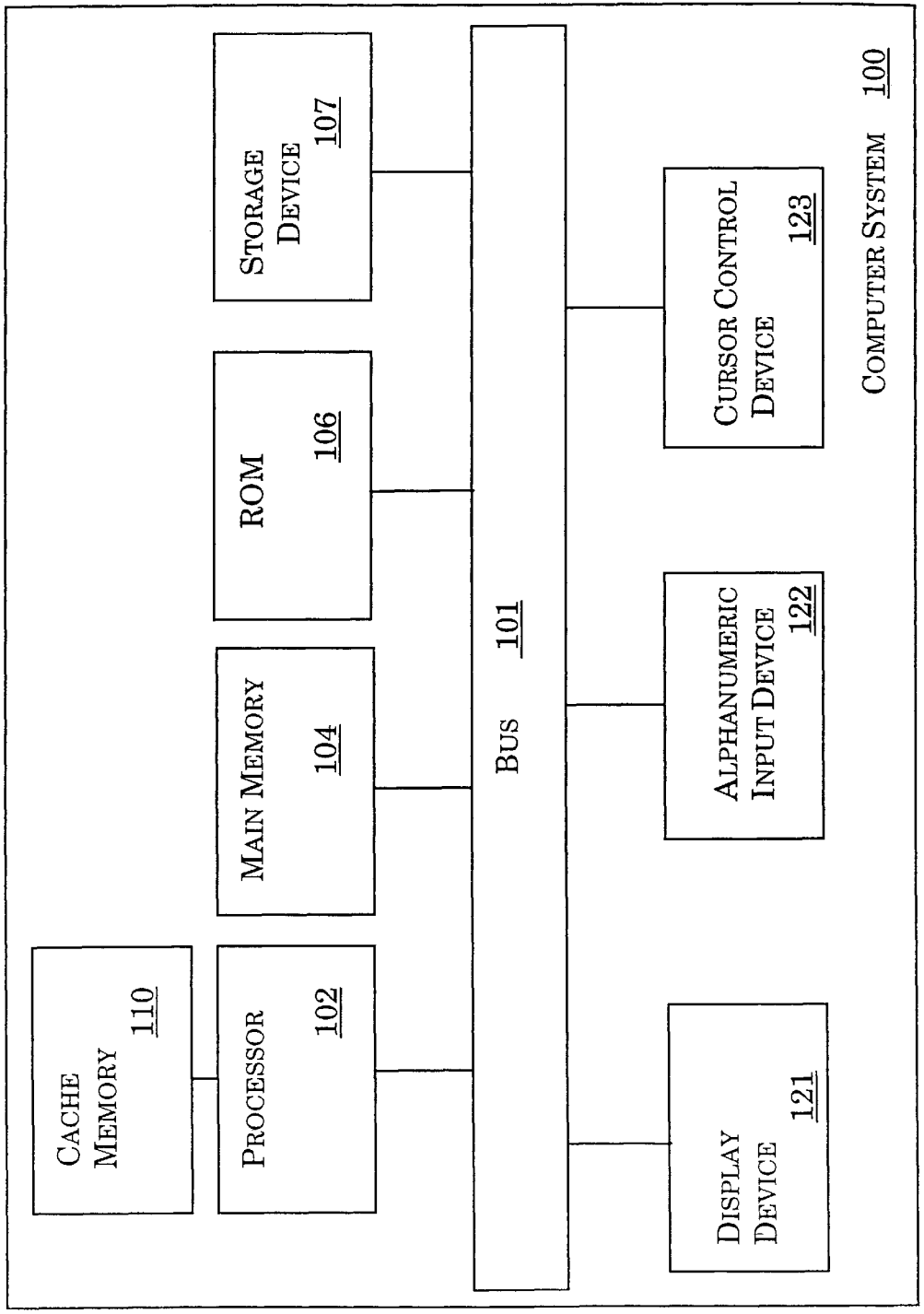
FIG. 1 is one embodiment of a block diagram of a computer system in which the present invention may be implemented.

FIG. 1 is one embodiment of a computer system upon which the present invention may be implemented. Computer system 100 comprises bus 101 or other communication device for communicating information, and processor 102 coupled to bus 101 for processing information. Computer system 100 further comprises random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises read only memory (ROM) and/or other static storage device 106 coupled to bus 101 for storing static information and instructions for processor 102. Data storage device 107 is coupled to bus 101 for storing information and instructions. Computer system 110 also comprises cache memory 110 coupled to processor 102. Cache memory 110 may be second level (L2) or third level (L3) cache memory that is functional in any manner known in the art. Cache memory 110 may also be coupled to bus 101 to communicate with processor 102.

Data storage device 107 such as a magnetic disk or optical disc and its corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control device 123, such as a mouse, a trackball, or cursor direction keys for communicating direction information and command selections to processor 102 and for controlling cursor movement on display 121.

In one embodiment, processor 102 is a source synchronous component and cache memory 110 is a non-source synchronous component in computer system 100. Cache memory 110 may be a common clocked component that receives the clock signal supplied to processor 102, or cache memory 110 may receive a clock signal from another source.

Figure 2:
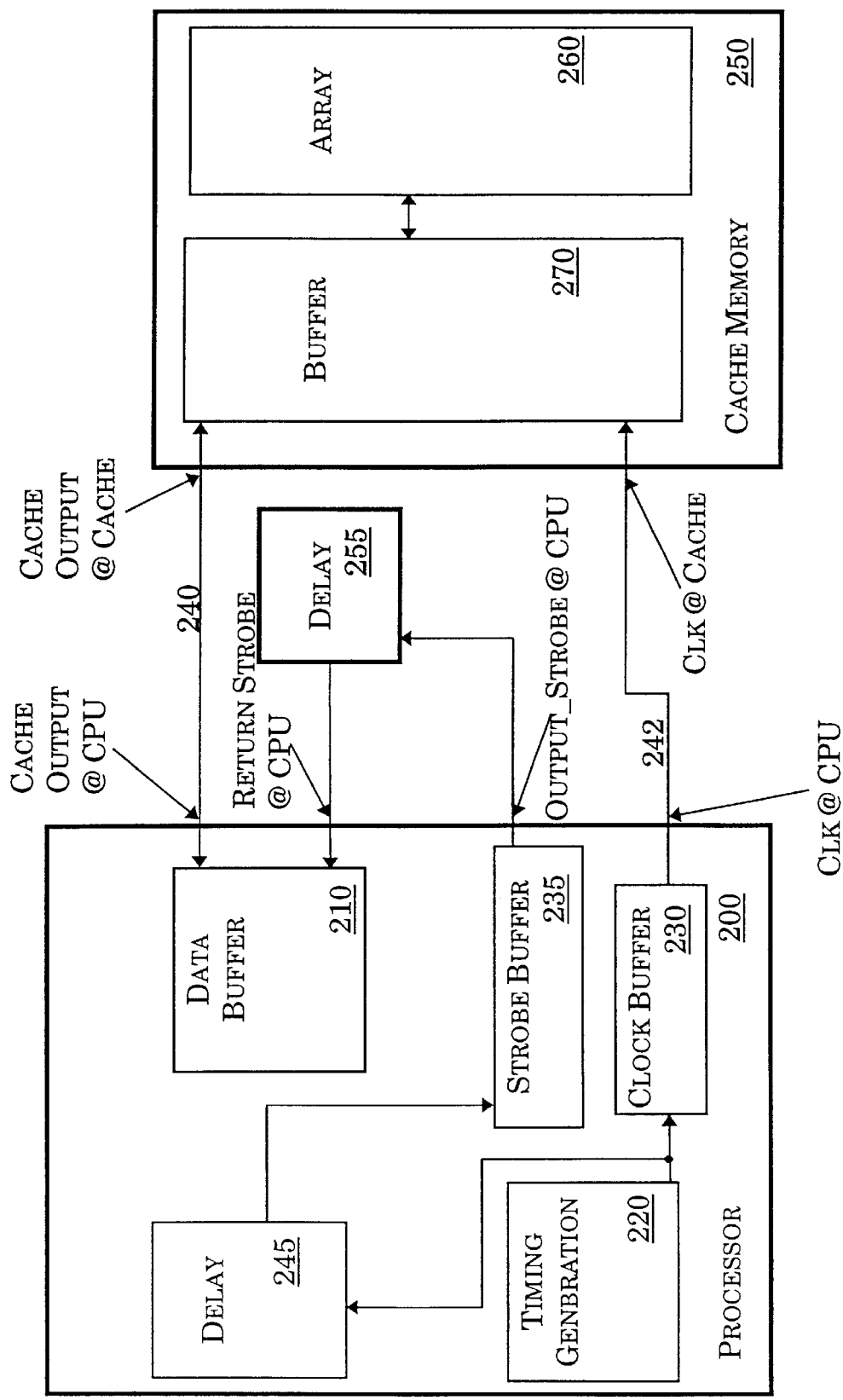
FIG. 2 is one embodiment of a block diagram of a source synchronous component and a common clocked component coupled according to the present invention.

FIG. 2 is one embodiment of a block diagram of a source synchronous component and a common clocked component coupled according to the present invention. In one embodiment, processor 200 is a source synchronous component and cache memory 250 is a common clocked component. Alternatively, cache memory 250 may be a different type of non-source synchronous component.

In one embodiment, timing generator 220 in processor 200 generates timing information in the form of strobe signals and clock signals. Timing generator 220 generates a clock signal with a frequency one-half of the processor clock signal. Timing generator 220 also generates a strobe signal that is used to communicate with source synchronous components. The strobe signal is, for example, sent though strobe buffer 235 to the cache memory when the cache memory is source synchronous (not shown in FIG. 2). The strobe signal may also be used with other source synchronous devices.

When cache memory 250 is a common clocked component, as shown in FIG. 2, a clock signal is sent to cache memory 250 though clock buffer 230. The clock signal is carried to cache memory 250 by line 242. In one embodiment, line 242 is a printed circuit board (PCB) trace; however, the clock signal may be communicated to cache memory 250 in some other manner. The strobe signal is fed back to processor 200 though delay element 245, which delays the strobe signal such that the strobe signal is received by data buffer 210 when data requested from cache memory 250 is valid at data buffer 210. The amount of delay provided, and the circuit elements used to provide the delay, are discussed in greater detail below.

Data buffer 210 in processor 200 is coupled to buffer 270 in cache memory 250 by bus 240. In one embodiment, bus 240 includes multiple PCB traces; however, other devices may also be used. The connection between data buffer 210 and buffer 270 is bi-directional. Array 260 is coupled to buffer 270 for storing data.

To store data in cache memory 250, data is sent from data buffer 210 in processor 200 to buffer 270 in cache memory 250. A clock signal is sent from clock buffer 230 to buffer 270 to drive cache memory 250. Data received by buffer 270 is stored in array 260 in any manner known in the art.

To retrieve data from cache memory 250, data stored in array 260 is retrieved and temporarily stored in buffer 270. The data stored in buffer 270 is sent to processor 200 over bus 240. Data buffer 210 in processor 200 receives that data along with a strobe signal from delay element 245. In one embodiment, the strobe signal is provided to delay element 245 by strobe buffer 235. Alternatively, the strobe signal may be provided by a circuit element external to processor 200. The strobe signal provides an edge on which to sample incoming data.

In order to provide proper sampling of the data, the strobe signal output by strobe buffer 235 is timed to arrive at data buffer 210 when data from cache memory 250 is valid at data buffer 210. In one embodiment, the strobe signal is timed to arrive at approximately the midpoint of the valid window for data returned from cache memory 250. This timing is provided by delaying the strobe signal by a predetermined amount of time such that the strobe signal arrives at data buffer 210 at the appropriate time.

The amount of time required to retrieve data from cache memory 250 has several components. A period of time is required for the clock signal to travel from the output of timing generation circuit 220 to the output of clock buffer 230. In one embodiment, this time period matches the period of time required for the strobe signal to travel from the output of timing generation circuit 220 to the output of strobe buffer 235. Matching of delay between strobe buffer 235 and clock buffer 230 is not necessary; however, doing so simplifies determination of delay provided by delay element 245. Delay from the output of timing generation circuit 220 and the output of clock buffer 230 is clock out time ($t_{co}$).

In addition, a propagation delay occurs as signals travel between processor 200 and cache memory 250. This is called flight time ($t_{fl}$). In one embodiment, processor 200 and cache memory 250 are physically arranged so that the same propagation delay occurs when signals travel from cache memory 250 to processor 200 because the physical distance traveled is the same in both directions. It should be noted that the flight time of signals from processor 200 to cache memory 250 and from cache memory 250 to processor 200 are not required to be the same to practice the present invention. The amount of time required for cache memory 250 to process data requests is also part of the amount of time required to retrieve data from cache memory 250 and is called data out time ($t_{do}$). Thus, the amount of time required to retrieve data from cache memory 250 and return the data to processor 200 can be expressed as:

$$t_{retreival} = t_{co} + 2t_{fl} + t_{do}. \tag{1}$$

when flight times to and from cache memory 250 are equal. If the flight times are not equal two different flight time components are included in Equation 1. Equation 1 provides the beginning of the valid data window for data retrieved from cache memory 250. Thus, a strobe signal generated by timing generation circuit 220 delayed at least $t_{retreival}$ provides a strobe edge on which to sample valid data retrieved from cache memory 250. The strobe delay may be expressed as:

$$t_{strobe\_delay} = t_{so} + t_{s\_fl} + t_{delay\_245} \tag{2}$$

where $t_{delay\_245}$ is the delay provided by delay element 245 and $t_{s\_fl}$ is the flight time delay of the strobe signal, represented by delay element 255.

Assuming a two processor clock (p_clk) valid data window, the strobe delay may be bounded by:

$$t_{retreival} < t_{strobe\_delay} < t_{retreival} + 2p\_clk \tag{3}$$

In one embodiment, the strobe signal is received at the midpoint of the valid data window lasting two processor clock cycles, in which case the strobe delay may be expressed as:

$$t_{strobe\_delay} = t_{retreival} + p\_clk \tag{4}$$

Substitution Equations (1) and (2) into Equation (4) results in $$t_{strobe\_delay} = t_{co} + 2t_{fl} + t_{do} + p\_clk = t_{so} + t_{s\_fl} + t_{delay\_245} \tag{5}$$

One advantage of this embodiment is that $t_{co}$ and $t_{so}$ can be designed to match and Equation (5) may be simplified to:

$$t_{strobe\_delay} = 2t_{fl} + t_{do} + p\_clk = t_{s\_fl} + t_{delay\_245} \quad (6)$$

Rearrangement of Equation (6) to isolate $t_{delay\_245}$ describes the delay provided by delay element 245:

$$t_{delay\_245} = 2t_{fl} - t_{s\_fl} + t_{do} + p\_clk. \quad (7)$$

In one embodiment, $t_{do}$, the time required for the cache memory to process and generate an output is equal to a multiple of p_clk. In such an embodiment, the delay provided by delay element 245 may be expressed as:

$$t_{delay\_245} = (2t_{fl} - t_{s\_fl}) + Np\_clk \quad (8)$$

where $N \geq 1$. In one embodiment, N=1; however, N may be increased to provide additional delay, if necessary.

Strobe delay may be adjusted by varying delay elements 245 and 255. In one embodiment, delay element 255 is a wire on a printed circuit board (PCB) and the delay is set to match the signal's round trip delay.

$$t_{delay\_255} = t_{s\_fl} = 2t_{fl} \quad (9)$$

where $t_{s\_fl} = (l_{wire})(signal\_speed)$. In this case, Equation (8) requires that $t_{delay\_245} = Np\_clk$. Of course, other amounts of delay may be provided by delay elements 245 and 255 to satisfy Equation (3). Alternatively, delay elements 245 and 255 may be provided by a logic gate, a passive circuit element, such as an RC circuit, or any other circuitry that provides a determinable amount of delay.

FIG. 3 is one embodiment of a timing diagram of clock and strobe signals according to the present invention. The timing diagram show delays discussed above with respect to FIG. 2 for various timing (clock and strobe) signals as well as relationships between signals.

The P_CLK signal is the processor clock signal that drives the processor and is used to generate system clock signals. In one embodiment, the period for the P_CLK signal is 4 ns, which corresponds to a 500 MHz clock signal. Of course, other clock signals having either a higher frequency or a lower frequency may be used. In FIG. 3, the rising edges of the P_CLK signal define time periods with respect to other signals.

The CLK@CPU signal is the system clock at the output of clock buffer 230. In one embodiment, the CLK@CPU signal period is twice the P_CLK signal period; however, other periods may be used. The rising edge of the CLK@CPU signal is delayed with respect to the rising edge of the P_CLK signal. This delay is the clock out ($t_{co}$) delay and is the result of propagation of the system clock signal through clock buffer 230.

The CLK@CACHE signal is the system clock at buffer 270. The CLK@CACHE signal as the same period as the CLK@CPU signal; however, the rising edges of the two signals are not aligned. The offset between the rising edges of the CLK@CPU signal and the CLK@CACHE signal is the delay caused by the propagation of the clock signal from the processor to the cache ($t_f$).

The CACHE_OUTPUT@CPU signal represents the time periods for which a valid output from the cache memory is provided at data buffer 210. The offset from the rising edge of CLK@CACHE and the valid cache memory output is the data out ($t_{do}$) time of the cache memory. The length of $t_{do}$ is dependent upon the cache memory used. In one embodiment, cache memory with a $t_{do}$ equal to one P_CLK cycle is used; however, other types of cache memory may also be used.

The OUTPUT_STROBE@CPU signal is the strobe signal output from strobe buffer 235 after the strobe signal being delayed by delay element 245. In FIG. 3, $t_{delay\_245}$ is set to 2p_clk. OUTPOUT_STROBE@CPU toggles 2p_clk later ($t_2$). The RETURN_STROBE@CPU signal is the delayed strobe signal from delay element 245 that is used to sample the data from the cache memory. In one embodiment, the amount of delay, $t_{delay\_255}$, is set equal to a signal's round trip delay. In this example, data is sampled on falling edges of the RETURN_STROBE@CPU signal at the midpoint of the valid data window; however, data may be sampled any time that data is valid.

Thus, the present invention allows a source synchronous component, such as a processor, to communicate with a common clocked component, such as a cache memory, via a source synchronous interface. By allowing a source synchronous component to communicate with a non-source synchronous component, the present invention provides greater flexibility to systems having source synchronous components. Of course, the present invention may be used with components other than a processor and a cache memory.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   a source synchronous component having a data buffer to send signals to and receive signals from a non-source synchronous component and a timing generation circuit coupled with the data buffer to provide timing information to the non-source synchronous component; and
   a delay element coupled between the timing generation circuit and the data buffer to delay a strobe signal from the timing generation circuit such that the strobe signal is received by the data buffer when data requested from the non-source synchronous component is received by the data buffer.

2. The source synchronous component of claim 1, wherein the strobe signal is received by the data buffer at a midpoint of a timing window when the data requested from the non-source synchronous component is valid at the interface.

3. The source synchronous component of claim 1, wherein the delay element comprises a wire.

4. The source synchronous component of claim 1, wherein the delay element comprises a logic gate.

5. The source synchronous component of claim 1, wherein the delay element comprises a passive delay element.

6. The source synchronous component of claim 1, wherein the source synchronous component comprises a processor.

7. The source synchronous component of claim 1, wherein the non-source synchronous component comprises a cache memory.

8. The source synchronous component of claim 1, wherein delay provided by the delay element is a multiple of a synchronous component clock cycle.

9. The source synchronous component of claim 1, wherein a first length of time required to output a clock signal from the timing generation circuit to a first output node of the source synchronous component is equal to a second length of time required to output the strobe signal from the timing generation circuit to a second output node of the source synchronous component.

10. The source synchronous component of claim 1, wherein a flight time for the strobe signal to travel from the timing generation circuit to the data buffer is equal to a flight time for a signal to travel from the source synchronous component to the non-source synchronous component and back to the source synchronous component.

11. The source synchronous component of claim 1, wherein the strobe signal is generated during an access to the non-source synchronous component and not generated otherwise.

12. A method for capturing data from a non-source synchronous component in a source synchronous component comprising:

requesting data from the non-source synchronous component with the source synchronous component;

generating a strobe signal with the source synchronous component;

sending the strobe signal to the non-source synchronous component and to a data buffer of the source synchronous component; and delaying the strobe signal such that the strobe signal is received by a data buffer of the source synchronous component when data requested from the non-source synchronous component is received by the data buffer.

13. The method of claim 12, wherein the strobe signal is received at an approximate midpoint of a timing window when the data requested from the non-source synchronous component is valid at the source synchronous component.

14. The method of claim 12, wherein delaying the strobe signal such that the strobe signal is received by the source synchronous component when data requested from the non-source synchronous component is valid comprises propagating the strobe signal along a wire.

15. The method of claim 12, wherein delaying the strobe signal such that the strobe signal is received by the source synchronous component when data requested from the non-source synchronous component is valid comprises propagating the strobe signal though a logic gate.

16. The method of claim 12, wherein delaying the strobe signal such that the strobe signal is received by the source synchronous component when data requested from the non-source synchronous component is valid comprises delaying the strobe signal a length of time equal to an integral number of synchronous component clock cycles.

17. The method of claim 12 further comprising generating a strobe signal in response to access to the non-source synchronous component.

18. An apparatus for capturing data from a non-source synchronous component by a source synchronous component comprising:

means for requesting data from the non-source synchronous component with the source synchronous component;

means for generating a strobe signal with the source synchronous component;

means for sending the strobe signal to the non-source synchronous component and to a data buffer of the source synchronous component; and means for delaying the strobe signal such that the strobe signal is received by a data buffer of the source synchronous component when data requested from the non-source synchronous component is received by the data buffer.

19. The apparatus of claim 18, wherein the strobe signal is received at an approximate midpoint of a timing window when the data requested from the non-source synchronous component is valid at the source synchronous component.

20. A computer system comprising:

a bus;

a non-source synchronous component coupled to the bus;

a source synchronous component coupled to the bus, the source synchronous component having a timing generation circuit that generates a clock signal and a strobe signal; and a delay element coupled between the timing generation circuit and a latching circuit in the source synchronous component, the delay element delaying the strobe signal such that the strobe signal is received by the latching circuit when data from the non-source synchronous component is received by the latching circuit, the strobe signal to latch the data received from the source synchronous component.

21. The system of claim 20, wherein the strobe signal is received by the latching circuit at an approximate midpoint of a timing window when data requested from the non-source synchronous component is valid at the latching circuit.

22. The system of claim 20, wherein the delay element comprises a wire.

23. The system of claim 20, wherein the non-source synchronous component comprises a common clocked component.

24. The system of claim 20, wherein delay provided by the delay element is equal to a integral number of source synchronous component clock cycles.

25. The system of claim 20, wherein a first length of time required to output a clock signal from the source synchronous component is equal to a second length of time required to output a strobe signal from the source synchronous component.

26. The system of claim 20, wherein a first flight time for the strobe signal is equal to a second flight time for a signal to travel from the source synchronous component to the non-source synchronous component and back to the source synchronous component.

* * * * *